(12) United States Patent
Anderson et al.

(10) Patent No.: US 11,967,059 B2
(45) Date of Patent: Apr. 23, 2024

(54) METHODS AND APPARATUS TO IDENTIFY HEADLANDS

(71) Applicant: Deere & Company, Moline, IL (US)

(72) Inventors: Scott W. Anderson, Johnston, IA (US); Mohammadkazem Fotouhi Ardakani, Johnston, IA (US)

(73) Assignee: Deere &Company, Moline, IL (US)

( * ) Notice: Subject to any disclaimer, the term of this patent is extended or adjusted under 35 U.S.C. 154(b) by 345 days.

(21) Appl. No.: 17/323,480

(22) Filed: May 18, 2021

(65) Prior Publication Data

US 2022/0375060 A1    Nov. 24, 2022

(51) Int. Cl.
| | |
|---|---|
| *G06T 7/00* | (2017.01) |
| *A01B 79/00* | (2006.01) |
| *A01D 41/02* | (2006.01) |
| *G06T 7/11* | (2017.01) |
| *G06T 7/149* | (2017.01) |
| *G06T 7/73* | (2017.01) |

(52) U.S. Cl.
CPC .......... *G06T 7/0004* (2013.01); *A01B 79/005* (2013.01); *A01D 41/02* (2013.01); *G06T 7/11* (2017.01); *G06T 7/149* (2017.01); *G06T 7/75* (2017.01); *G06T 2207/10032* (2013.01); *G06T 2207/30188* (2013.01)

(58) Field of Classification Search
None
See application file for complete search history.

(56) References Cited

U.S. PATENT DOCUMENTS

| | | | |
|---|---|---|---|
| 8,209,075 B2 | 6/2012 | Senneff et al. | |
| 2007/0255470 A1 | 11/2007 | Diekhans et al. | |
| 2009/0240430 A1* | 9/2009 | Sachs | A01B 79/005 701/408 |
| 2014/0224377 A1* | 8/2014 | Bonefas | G05D 1/0251 141/94 |
| 2015/0285647 A1 | 10/2015 | Meyer zu Helligen et al. | |
| 2016/0343142 A1* | 11/2016 | Gaiha | G06T 7/181 |
| 2017/0144702 A1 | 5/2017 | Dang et al. | |
| 2017/0168501 A1 | 6/2017 | Ogura et al. | |
| 2018/0364739 A1 | 12/2018 | Foster et al. | |

(Continued)

FOREIGN PATENT DOCUMENTS

JP    6031491 B2    11/2016

OTHER PUBLICATIONS

Zhou K, Jensen AL, Sørensen CG, Busato P, Bothtis DD. Agricultural operations planning in fields with multiple obstacle areas. Computers and electronics in agriculture. Nov. 1, 2014;109:12-22. (Year: 2014).*

(Continued)

*Primary Examiner* — Emily C Terrell
*Assistant Examiner* — Nathan J Bloom
(74) *Attorney, Agent, or Firm* — HANLEY, FLIGHT & ZIMMERMAN, LLC

(57) ABSTRACT

Methods and apparatus to identify headlands are disclosed. A disclosed example apparatus to identify a headland of a field includes an image analyzer to generate an image from data corresponding to path information of at least one field operation performed on the field, a mask generator to generate a mask of the image based on the image, and a headland identifier to identify the headland in the field based on the mask.

19 Claims, 10 Drawing Sheets

(56) References Cited

U.S. PATENT DOCUMENTS

2019/0353483 A1    11/2019    Liu et al.
2021/0183099 A1*    6/2021    Fujii ........................ G06T 7/248
2021/0224556 A1*    7/2021    Xu .......................... G06V 10/44

OTHER PUBLICATIONS

Hameed IA, Bochtis DD, Sørensen CG, Nøremark M. Automated generation of guidance lines for operational field planning. Biosystems engineering. Dec. 1, 2010;107(4):294-306. (Year: 2010).*

Nilsson RS, Zhou K. Method and bench-marking framework for coverage path planning in arable farming. Biosystems Engineering. Oct. 1, 2020;198:248-65. (Year: 2020).*

Extended European Search Report and Written Opinion issued in European Patent Application No. 22171127.8, dated Oct. 24, 2022, in 08 pages.

Bochtis et al., "Minimising the non-working distance travelled by machines operating in a headland field pattern," Biosystems Engineering 101, Aug. 6, 2008, 12 pages, Elsevier Ltd., Thessaloniki, Greece.

Evans, IV, "Grain Harvest Logistics Modeling and Optimization of Single Harvester/Grain Cart Operations," Doctoral Dissertation, Oct. 2018, 112 pages, The University of Nebraska, Lincoln, Nebraska.

Hameed et al., "Automated generation of guidance lines for operational field planning," Biosystems Engineering 107, Sep. 15, 2010, 14 pages, Elsevier Ltd., Tjele, Denmark.

Heiß et al., "Determination of Cultivated Area, Field Boundary and Overlapping for a Plowing Operation Using ISO 11783 Communication and D-GNSS Position Data," Agriculture 2019, 9, 38, Feb. 19, 2019, 17 pages, Stuttgart, Germany.

Jin et al., "Coverage Path Planning on Three-Dimensional Terrain for Arable Farming," Journal of Field Robotics, Feb. 14, 2011, 17 pages, Iowa State University, Ames, Iowa.

Oksanen et al., "Coverage Path Planning Algorithms for Agricultural Field Machines," Journal of Field Robotics, Mar. 10, 2009, 18 pages, Wiley InterScience, TKK Helsinki University of Technology, Espoo, Finland.

Zandonadi, "Computational Tools for Improving Route Planning in Agricultural Field Operations," Theses and Dissertations—Biosystems and Agricultural Engineering, 2012, 125 pages, University of Kentucky, Lexington, Kentucky.

* cited by examiner

US 11,967,059 B2

METHODS AND APPARATUS TO IDENTIFY HEADLANDS

FIELD OF THE DISCLOSURE

This disclosure relates generally to agricultural area analysis and, more particularly, to methods and apparatus to identify headlands.

BACKGROUND

During field operations, a harvesting machine, such as a combine or self-propelled forage harvester, is typically used to harvest large quantities of agricultural material, such as grain or silage, in a field. Typically, the harvesting machine traverses the field by moving across the field and turning at an end of the field to further traverse the field along a different pathway. The area in which the harvesting machine turns is usually located at peripheral ends or borders of the field and is typically referred to as a headland or turn-row. The headland can be an area in the field that is two to four times the width of the harvesting machine. Determination of the headland associated with previous field operations can impact crop yields and/or operating efficiency related to farm operations by affecting path planning and/or navigation through the field.

BRIEF DESCRIPTION OF THE DRAWINGS

The figures are not to scale. In general, the same reference numbers will be used throughout the drawing(s) and accompanying written description to refer to the same or like parts.

Figure 1:
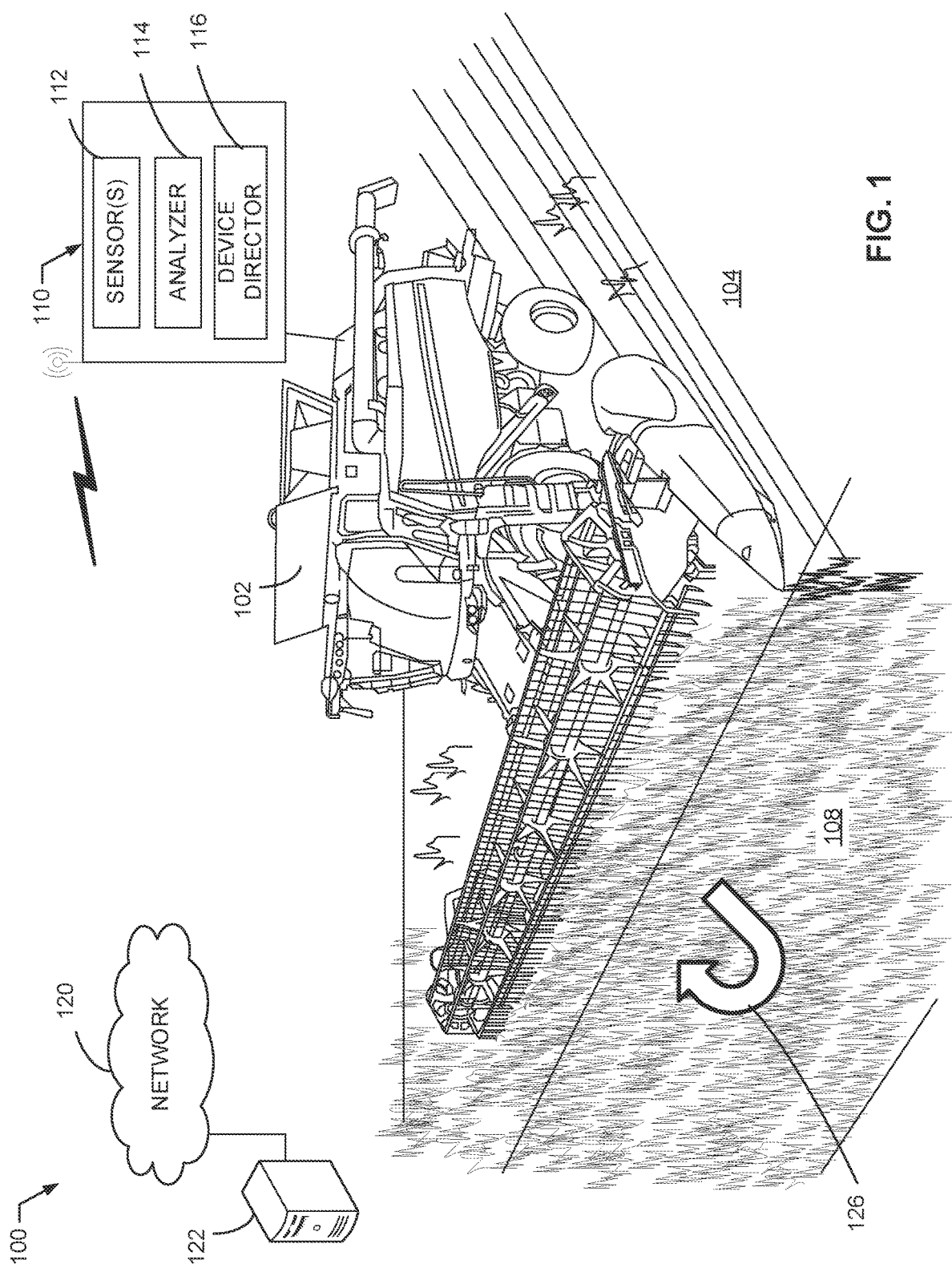
FIG. 1 illustrates an example agricultural analyzer system in accordance with teachings of this disclosure.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Methods and apparatus to identify headlands are disclosed. Headlands (e.g., headland zones, headland areas, etc.) are generally areas of a field in which an agricultural machine, such as a harvesting machine, turns. Accordingly, the headlands are often located at peripheral ends or borders of the field. Determination of a location of a defined headland (e.g., a headland defined by or determined based on prior field operations) in the field can be advantageous for minimizing the crop damage, soil compaction, and as a result, maximizing yields. Also, determining the location can be essential in several other applications, such as path planning or field decomposition. Path planning can reduce the inactive time that farmers spend in the field and the necessity of highly trained and experienced machine operators. Further, determination of the location of the headland can become more significant for fields with complex geometry or hilly terrains. In some known implementations, satellite imagery is utilized to characterize and determine headlands. However, use of the satellite imagery can entail significant cost and effort.

Examples disclosed herein enable accurate, quick and cost-effective determination and/or characterization of headlands that can improve yields, as well as operational efficiency of agriculture operations. Examples disclosed herein can easily adapt to complex geometries, in-field obstacles and hilly terrains while accommodating different topography, and soil properties. Further, examples disclosed herein are computationally efficient due to utilization of computer vision (CV) techniques that have been significantly refined and/or optimized in recent years. Even further, examples disclosed herein do not necessitate user input or external library data, and can be relatively easy to verify due to the analyses being performed in a visual domain.

Examples disclosed herein utilize computer vision techniques (i.e., computer vision processing techniques) in combination with positional/pathway data of an agricultural vehicle to identify, compute and/or determine a headland. Examples disclosed herein generate and/or convert the aforementioned positional and/or pathway data into images. By converting the data to images, the data is automatically smoothed, thereby enabling computer vision techniques to handle outliers in the data. In turn, according to examples disclosed herein, masks are generated based on the images (e.g., via filters or other methods). The masks can include an exterior mask, a variation mask, a boundary mask, a track density mask, a heading edges mask and/or a turn mask, etc. As a result, the headland is identified based on the masks. In some examples, contours (e.g., contours represented in contour data) are generated from the masks for use in identification and/or representation of the headland.

In some examples, the data is filtered for image generation. In some such examples, a blur filter or a median filter is implemented to filter the data. In some examples, multiple ones of the masks are combined into a combined mask that is subsequently utilized and/or analyzed for determination of the headland. In some examples, confidence levels are assigned to pixels of the images. Additionally or alternatively, confidence levels are assigned to pixels of the aforementioned combined mask. In some examples, median filtering is performed to determine the headland. In some examples, the masks are generated via a convolutional analysis. In some examples, the images are generated by transferring the data from a data domain to a geospatial domain.

As used herein, the term "image" refers to an image representation. Accordingly, the term "image" can refer to an image that is not obtained with an image sensor or equivalent, such as a generated image. As such, the term "image" can refer to image data that is representative of images, but not visible. As used herein, the term "headland" refers to a zone or area in which an agricultural vehicle is to turn during a field operation. In particular, the term "headland" can refer to a 2-D area or 3-D volume. As used herein, the term "mask" refers to a representation, such as a graphical representation, of an aspect or category of data.

FIG. 1 illustrates an example agricultural analyzer system 100 in accordance with teachings of this disclosure. The agricultural analyzer system 100 of the illustrated example includes an agricultural machine or vehicle 102, which is implemented as a harvester in this example. In the illustrated example of FIG. 1, the agricultural vehicle 102 is traversing a field 104 and moving toward a headland 108 in which the agricultural vehicle 102 is to make a turn. In this example, the agricultural vehicle 102 includes and/or is communicatively coupled to a controller 110 which, in turn, includes sensor(s) 112, an analyzer 114 and a device director 116. According to the illustrated example of FIG. 1, the aforementioned controller 110 is communicatively coupled to a network (e.g., a cloud-based network, a cellular network, a wireless network, etc.) 120 and, in turn, servers (e.g., remote servers, cloud-based servers, etc.) 122. Additionally or alternatively, at least some portions of the controller 110 are implemented in the servers 122 and/or the network 120. However, any appropriate network and computing topology can be implemented instead (e.g., a cloud-based networking implementation associated with the network 120).

To process crops in the field 104, the agricultural vehicle 102 of the illustrated example traverses the field 104 along generally straight rows, all of which are generally oriented parallel to one another in this example. To transition the agricultural vehicle 102 between the different rows, the agricultural vehicle 102 turns in the headland 108, as generally indicated by an arrow 126. In this example, the headland 108 is associated with a periphery and/or outer boundaries of the field 104.

To determine, characterize and/or identify the headlands associated with the field 104, the agriculture analyzer system 100 utilizes data from the sensor(s) 112, which include at least one global positioning system (GPS) sensor in this example. However, any other appropriate type of sensor can be implemented instead. As will be discussed in greater detail below in connection with FIGS. 2-8, sensor data (e.g., positional data. path information, etc.) is utilized to generate images associated with travel of the agricultural vehicle 102 across the field 104. In turn, masks are generated based on the images. The masks can be utilized to generate contours associated with the headland 108. As a result, the contours can be utilized by a guidance system of the agricultural vehicle 102 to guide the agricultural vehicle 102. For example, the device director 116 can utilize the identified headland in conjunction with mapping/navigational software to direct movement of and/or control the agricultural vehicle 102. Identification of the headlands can also enable path planning software and/or systems to more effectively define pathways and/or navigation of the agricultural vehicle 102 to improve yields and reduce negative impacts to the field 104. Further, identification of the headlands can eliminate a need for an operator to enter headland information, thereby saving labor time and cost.

Figure 2A:
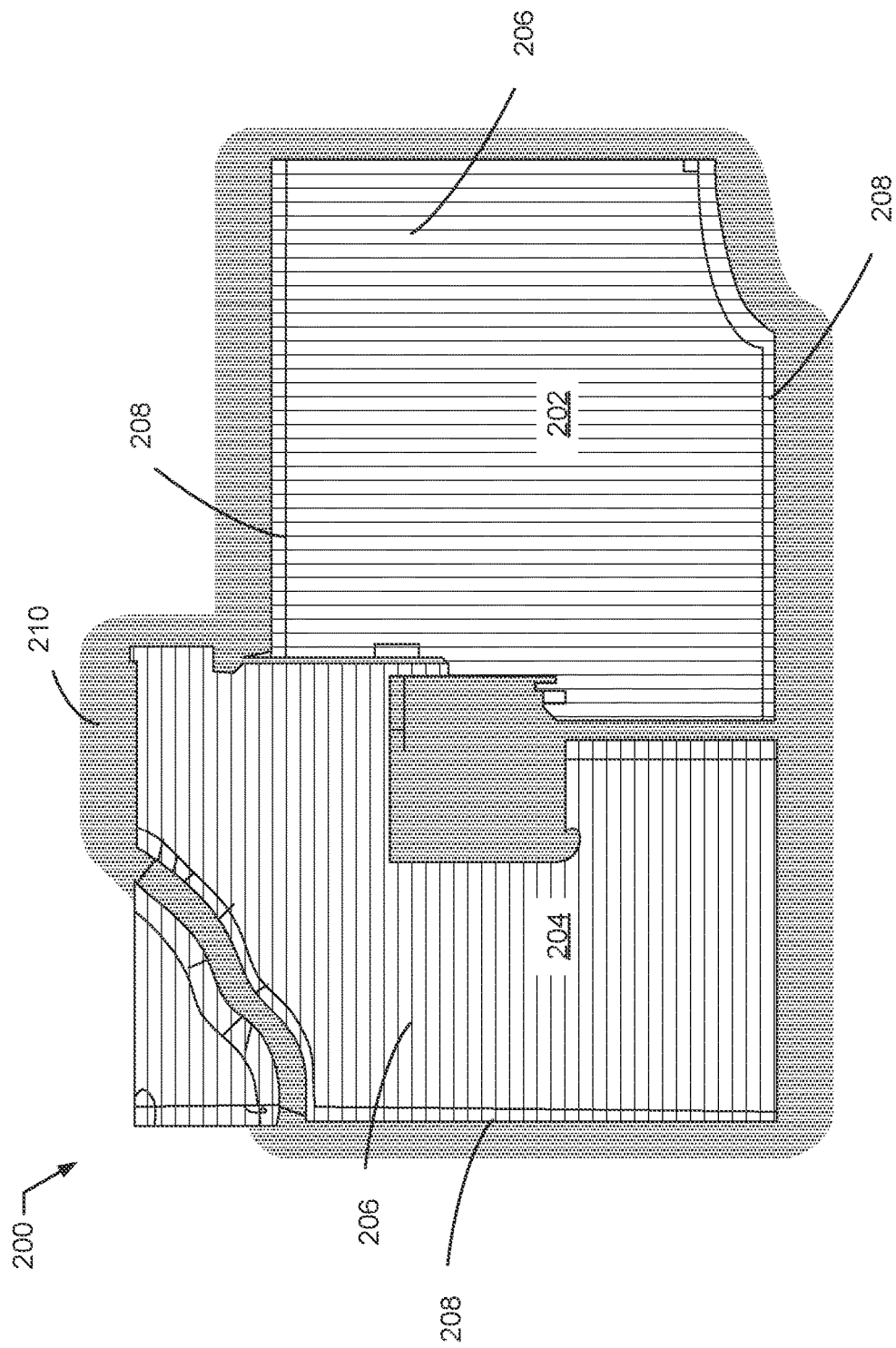
FIGS. 2A and 2B illustrate a field that can be analyzed by examples disclosed herein.
Figure 2B:
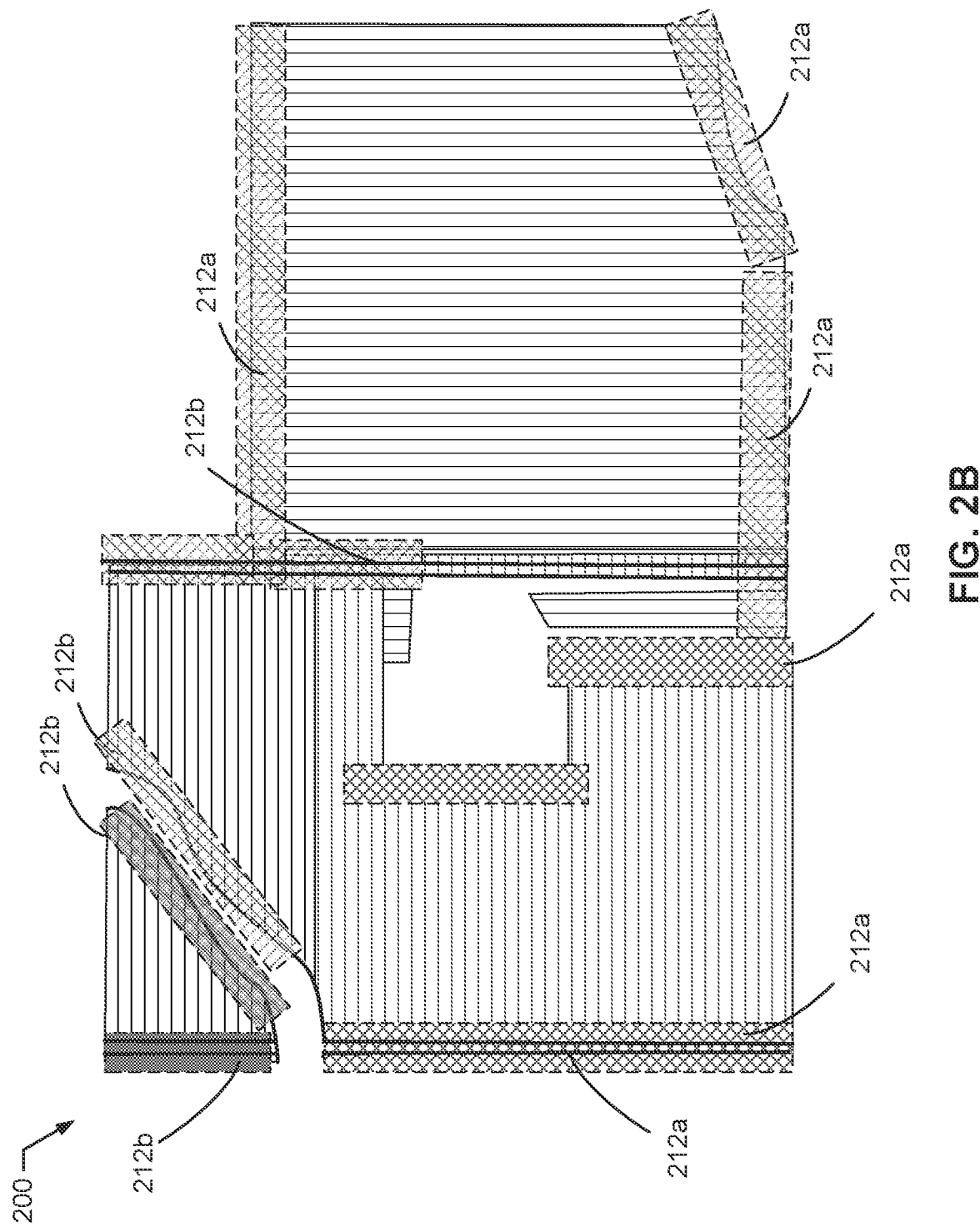

FIGS. 2A and 2B illustrate a field 200 that can be analyzed by examples disclosed herein. The views of FIGS. 2A and 2B are graphical representation of the field 200 that can be obtained through positional data or overhead imagery. Turning to FIG. 2A, an overhead view of the field 200 is shown. In the illustrated example, the field 200 includes areas 202, 204 with corresponding field tracks 206. In this example, regions 208 depict areas in which the agricultural vehicle 102 turns to move between the field tracks 206. Further, a border 210 surrounds the field 200.

FIG. 2B depicts the field 200 with headlands 212 (hereinafter 212a, 212b, etc.) depicted. In the illustrated view of FIG. 2B, the headlands 212a represent headlands that are commonly identifiable via known techniques while, in contrast, the headlands 212b correspond to headlands that can be missed with known techniques. The headlands 212b can be difficult to identify via known techniques due to discontinuities in the field 200. In contrast, examples disclosed can accurately determine and/or identify headlands without missing portions thereof.

Figure 3:
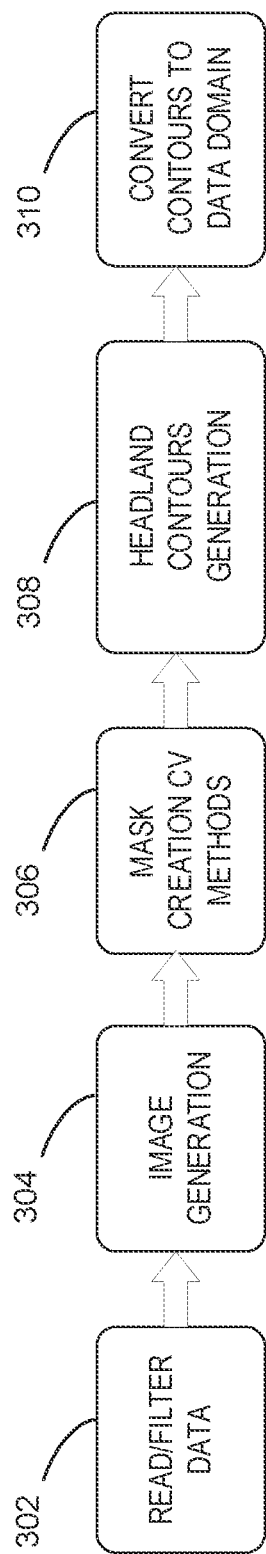
FIG. 3 is an overview of an example analysis that can be implemented in the example agricultural analyzer system of FIG. 1.

FIG. 3 is an overview of an example analysis that can be implemented in the example agricultural analyzer system 100 of FIG. 1. In particular, the example of FIG. 3 provides an overview of an example analysis that can be implemented to determine and/or identify at least one headland of a field that the field implement 102 has performed prior operations on. The analysis is described in greater detail below in connection with FIGS. 4-8.

According to the illustrated example, step 302 involves reading and filtering data. The data can correspond to path information or data of the agricultural vehicle 102 moving through the field. In this example, the data pertains to movement of the agricultural vehicle 102 across the field during a previous field operation.

At step 304, at least one image is generated from the data. For example, the at least one image is generated based on measured paths and/or positional data (e.g., positional and movement data) of the agricultural vehicle 102.

Subsequently, masks are created/generated at step 306. In particular, the masks are generated based on the at least one image using computer vision techniques.

At step 308, contours (e.g., headland zone contours) are generated. In particular, the contours are generated based on the masks. In some other examples, the contours are generated by a combined mask associated with the masks.

At step 310, the contours are converted to the data domain. For examples, the contours are converted into 2-D or 3-D coordinates so that programs (e.g., path planning programs, guidance programs, agronomic analyzer programs, etc.) can utilize the contours and account for the headland.

In some examples, historical farming practices are taken into account. In some examples, it is assumed that the agricultural vehicle 102 performs turns in the headland and that the headland is located where relatively abrupt changes of the agricultural vehicle 102 occur. In some examples, it is assumed that the headland is within a boundary of the field. Additionally or alternatively, in some examples, it is assumed that machine sections of the field are inactive inside the headland and planted once per an interval (e.g., an agricultural cycle, an annual cycle, a season, a crop cycle, etc.).

Figure 4:
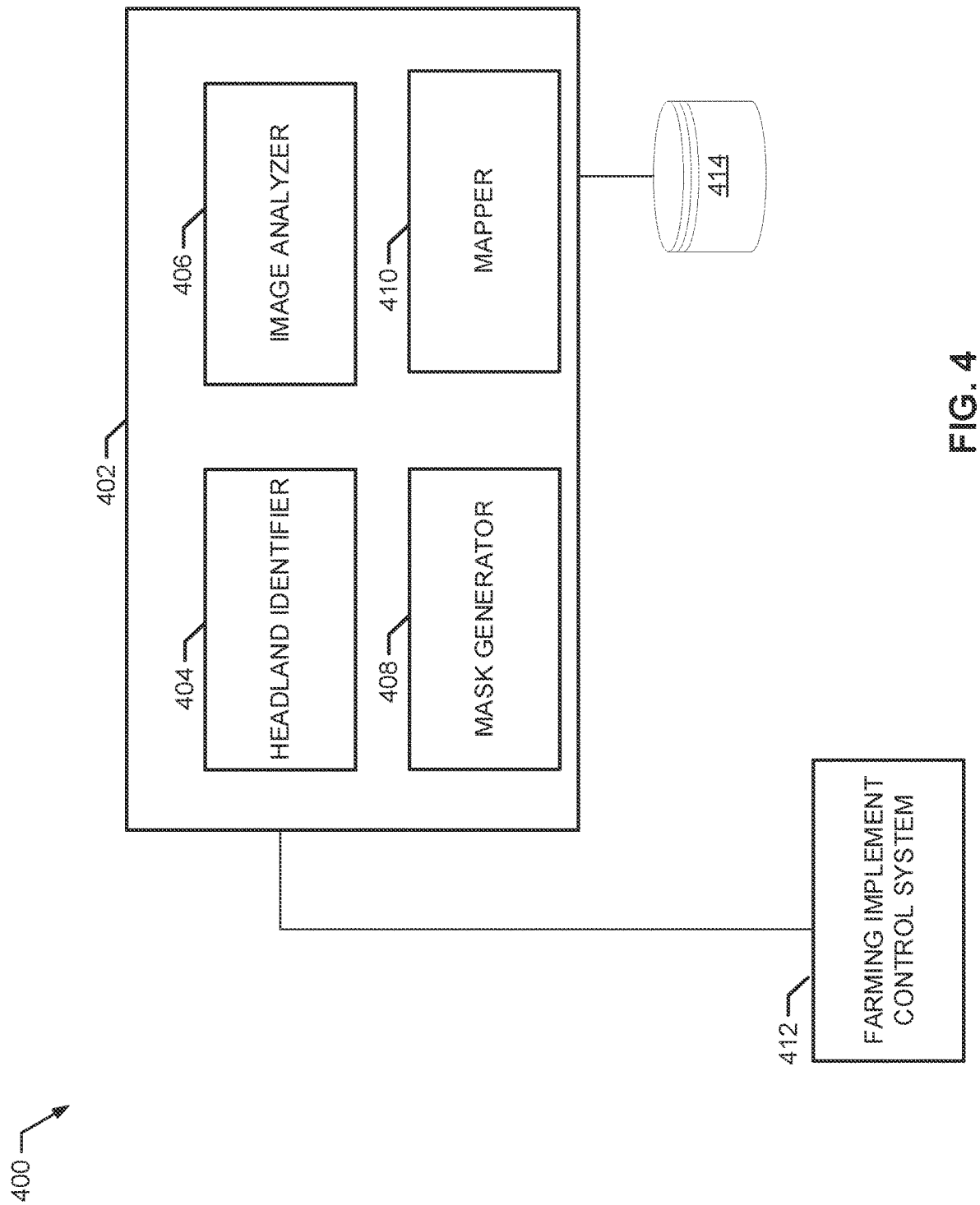
FIG. 4 is a schematic overview of an example headland analyzer system that can implement examples disclosed herein.

FIG. 4 is a schematic overview of an example headland analyzer system 400 that can be implemented in examples disclosed herein. The example headland analyzer system 400 can be at least partially implemented in and/or communicatively coupled with the agricultural vehicle 102, the network 120 and/or the networks servers 122 shown in FIG. 1. The headland analyzer system 400 of the illustrated example includes an analysis portion 402 which, in turn, includes a headland identifier 404, an image analyzer 406, a mask generator 408 and a mapper 410. In some examples, the analysis portion 402 is communicatively coupled to an agricultural vehicle control system 412, which can be associated with programming, guidance, pathway planning and/or control of the agricultural vehicle 102 shown in FIG. 1. In some examples, the analysis portion 402 is communicatively coupled to a data storage 414.

The example image analyzer 406 generates images from agronomic/field operations. In particular, the example image analyzer 406 utilizes driven/travelled paths and/or pathway information of the agricultural vehicle 102 (e.g., when the agricultural vehicle 102 is operated during seeding). The images can be generated from parameters, such as field tracks, heading and/or turn data associated with the data, for example. In other words, the images can be generated to represent the parameters (e.g., historical parameter data, travel information, boundary data, shape data, etc.) of a field in a pixel domain.

The mask generator 408 of the illustrated example generates masks from the aforementioned images. In this example, multiple masks are generated from the images. The example masks are representations that are generated based on pathway information associated with the images and have varying pixel density to represent different aspects of the pathway information. For example, the aspects correspond to boundaries, heading variation, turns, etc. Accordingly, the masks can include one or more of an exterior mask, a heading variation mask, a boundary mask, a track density mask, a heading edges mask or a turn mask. However, any other appropriate mask can be generated instead. In this example, the mask generator 408 utilizes computer vision techniques to generate the masks. However, any other appropriate methodology, filter method and/or image processing technique can be employed instead.

In some examples, the mask generator 408 generates the exterior mask from active sections of a field to determine an extent of the field. Additionally or alternatively, the boundary mask and/or a field boundary is determined by the mask generator 408 based on a Canny edge detector and contour generation methods. In some examples, the mask generator 408 utilizes a convolution analysis of at least one image to generate the heading variation mask. In some examples, a gradient analysis can be performed by the mask generator 408 to imply an edge of a headland in a field image. In some examples, the mask generator 408 determines and/or calculates u-turn locations in a field to generate a mask. Additionally or alternatively, the mask generator 408 determines which combination of masks are to be generated from the images (e.g., based on image properties, field data, field geometry, etc.). In some examples, the mask generator 408 adds further masks until a requisite quality threshold of data is met. In other words, the mask generator 408 can add further masks in a reiterative process to ensure that the analysis of the field has results (e.g., headland contours, headland coordinates, etc.) that meet or exceed a requisite quality level.

In the illustrated example, the headland identifier 404 identifies at least one headland from the masks. In particular, the example headland identifier 404 generates contours from the masks to identify the headland. Additionally or alternatively, the headland identifier 404 determines and/or calculates 2-D and/or 3-D coordinates of the headland from the masks to identify the headland. In some examples, the headland identifier 404 utilizes a combined mask to identify the headland. Additionally or alternatively, the headland identifier 404 determines and/or calculates a 2-D area or a 3-D volume (e.g., a polygon) of the headland.

The example mapper 410 is implemented to transfer data from a pixel space associated with the images to a geospatial domain. For example, the mapper 410 converts data from the images to the geospatial domain for subsequent mask generation via the mask generator 408. Additionally or alternatively, the mapper 410 generates map data (e.g., contours, coordinates) pertaining to the determined headland from pixel domain data.

In some examples, the storage 414 is implemented to store data, such as generated masks, generated images, map data corresponding to an identified headland, filter data, etc. In some examples, the stored data is utilized for path planning applications, guidance systems, or mapping. While multiple images and masks are described in connection with the example of FIG. 4, in some examples, only a single image and/or mask is utilized.

Figure 5:
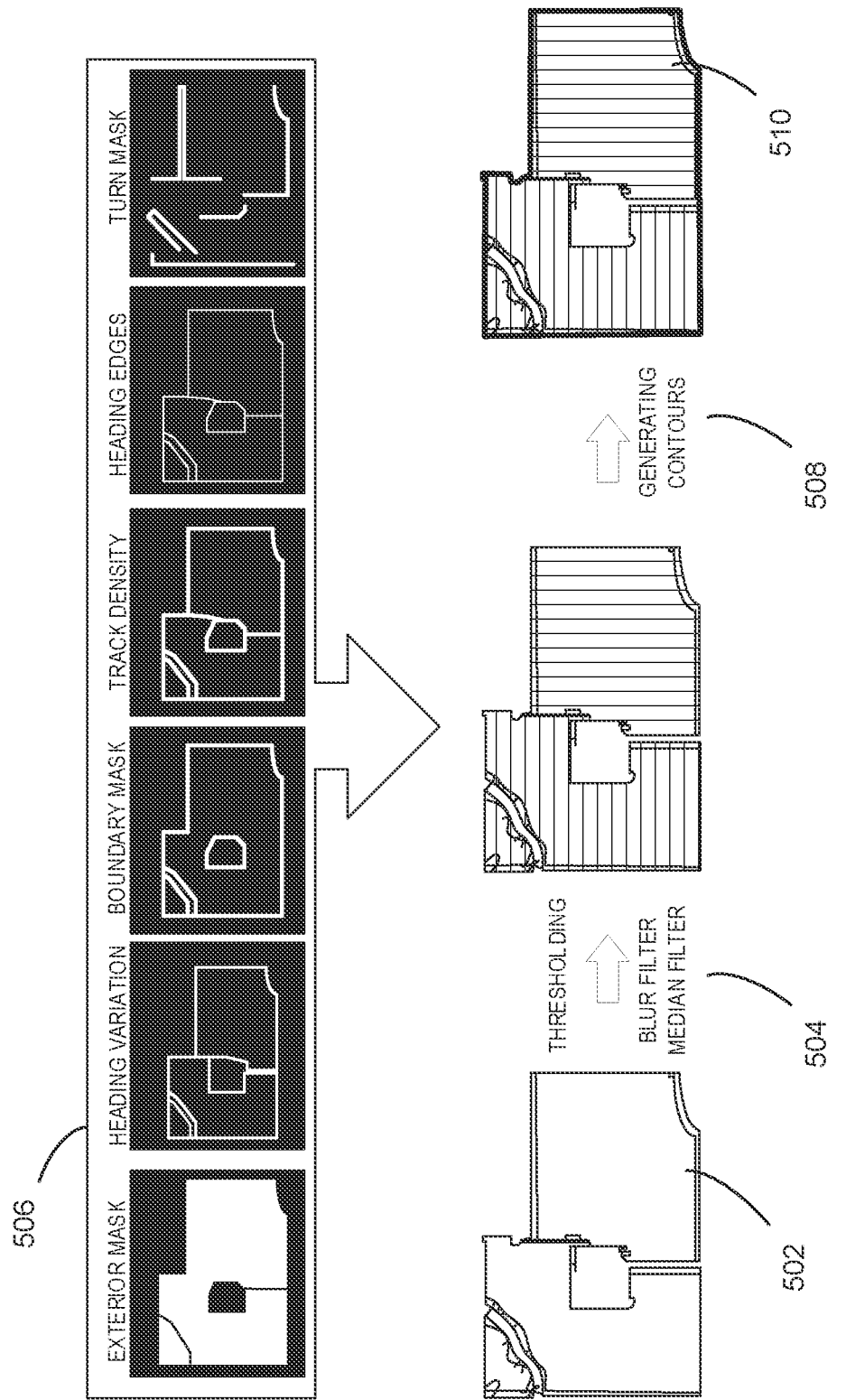
FIG. 5 depicts example data processing that can be implemented in examples disclosed herein.

FIG. 5 depicts example data processing that can be implemented in examples disclosed herein. In particular, the example data processing of FIG. 5 is shown in the example context of the field 200 shown in FIG. 2. The data processing of the illustrated example can be implemented by the headland analyzer system 400 shown in FIG. 4. In this example, field data 502 is processed via processing 504, which includes thresholding and filtering methods. Accordingly, the filtering methods can implement a blur filter and a median filter. In the illustrated example, masks 506 are generated from the filtered image. In turn, at processing 508, contours are generated to yield identified zones 510.

While an example manner of implementing the headland analyzer system 400 of FIG. 4 is illustrated in FIG. 4, one or more of the elements, processes and/or devices illustrated in FIG. 4 may be combined, divided, re-arranged, omitted, eliminated and/or implemented in any other way. Further, the example the example headland identifier 404, the example image analyzer 406, the example mask generator 408, the example mapper 410 and/or, more generally, the example headland analyzer system 400 of FIG. 4 may be implemented by hardware, software, firmware and/or any combination of hardware, software and/or firmware. Thus, for example, any of the example headland identifier 404, the example image analyzer 406, the example mask generator 408, the example mapper 410 and/or, more generally, the example headland analyzer system 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example headland identifier 404, the example image analyzer 406, the example mask generator 408, and/or the example mapper 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example headland analyzer system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
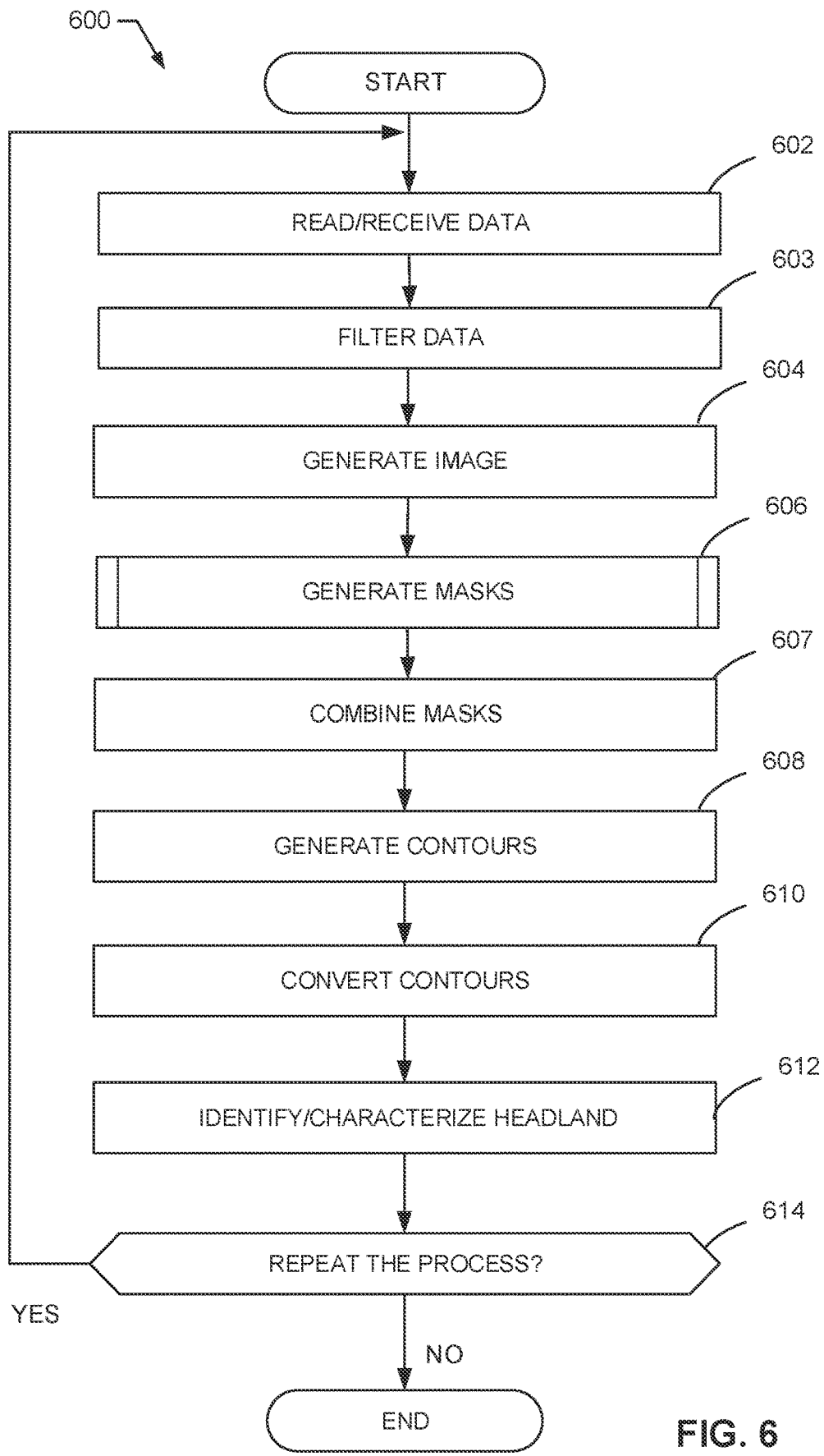
FIG. 6 is a flowchart representative of machine readable instructions which may be executed to implement the example agricultural analyzer system of FIG. 1 and/or the example headland analyzer system of FIG. 4.
Figure 7:
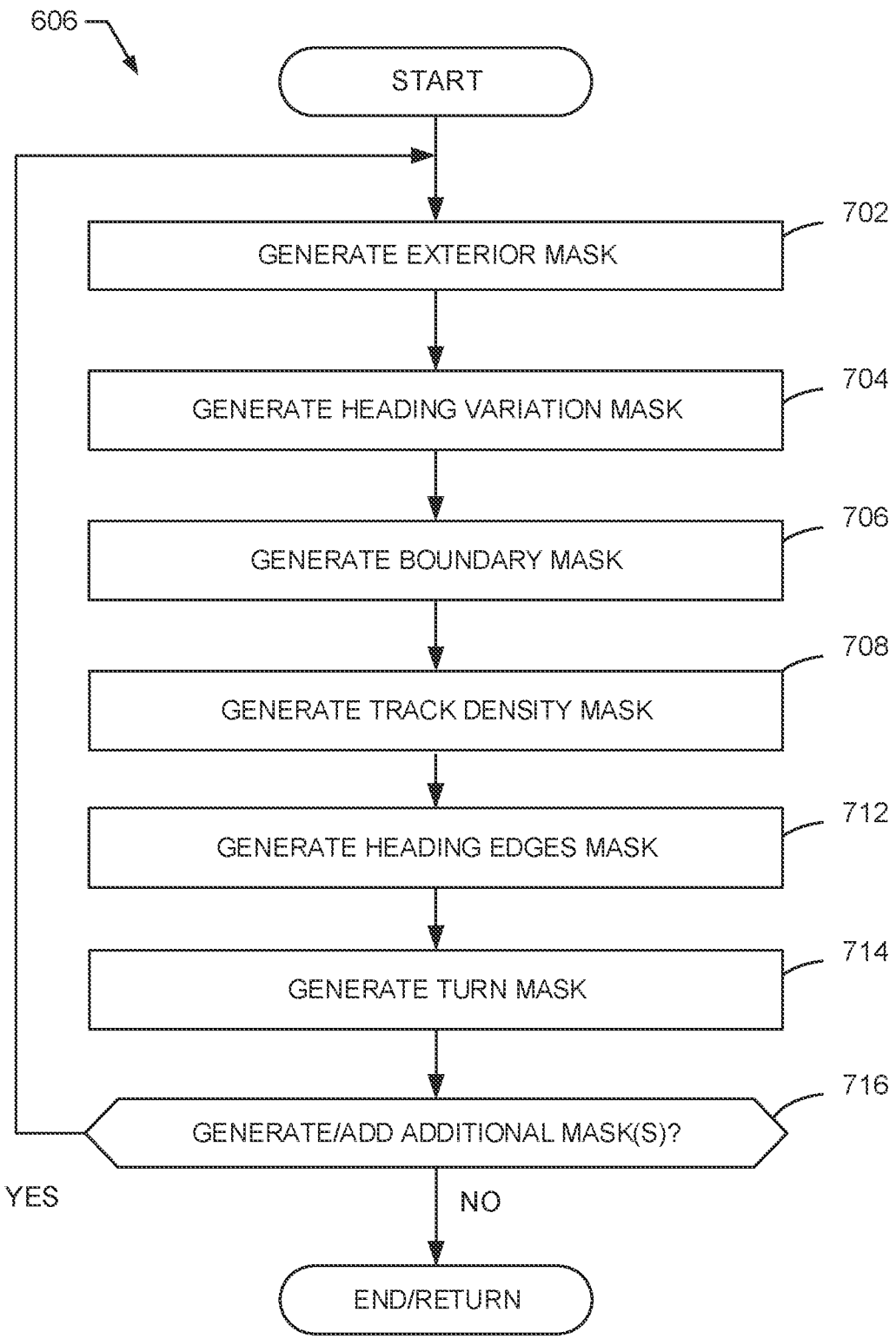
FIG. 7 is a flowchart representative of an example subroutine of the machine readable instructions of FIG. 6.

Flowcharts representative of example hardware logic, machine readable instructions, hardware implemented state machines, and/or any combination thereof for implementing the headland analyzer system 400 of FIG. 4 are shown in FIGS. 6 and 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6 and 7, many other methods of implementing the example headland analyzer system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 600 of FIG. 6 begins as a field has undergone a prior agronomic operation. In this example, data was collected during the prior agronomic operation. Accordingly, the data will be processed and analyzed to identify and/or determine at least one headland associated with the field. For example, contours for mapping and/or geospatial data will be generated for use with mapping/navigation software to account for the identified headland. In this example, the headland will be identified based on prior path information for use in guidance of the agricultural vehicle 102.

At block 602, the example image analyzer 406 reads/receives data. In this example, the data includes pathway data pertaining to the prior agronomic operation. Additionally or alternatively, the data can include turn data, u-turn data, and/or heading data, etc. The data can be obtained and/or downloaded from the agricultural vehicle 102. In some other examples, the data includes at least one image photographed from the field.

At block 603, the example image analyzer 406 filters the data. The data can be filtered by a blur filter, a median filter, or any other appropriate filter.

At block 604, the example image analyzer 406 generates at least one image from the data. In this example, multiple images that each have varying pixel densities are generated from the data (e.g., images with areas pertaining to higher pathway use with higher pixel densities, images with areas pertaining to a greater amount or degree of turns having higher pixel densities, etc.). The images of the illustrated example are based on a pixel domain. In other examples, the images are based on a geospatial domain. Additionally or alternatively, the images are filtered subsequent to being generated.

At block 606, the mask generator 408 of the illustrated example generates masks from the images generated by the image analyzer 406. As will be discussed in greater detail below in connection with FIG. 7, multiple masks are generated from the images. In this example, the masks correspond to processed representations of the images. In other words, the example masks represent specific aspects (e.g., turning, variation in heading, etc.) gathered from the images. In some examples, the mask generator 408 generates an exterior mask from an active section of the field to determine an extent of the field. Additionally or alternatively, a field boundary mask is generated based on a Canny edge detector and/or contour generation methods. In some examples, a convolution analysis of the images generates the heading variation mask and density mask. In some examples, a u-turn mask is generated based on u-turn locations of the agricultural vehicle 102 on the field.

At block 607, in some examples, the mask generator 408 combines at least two of the masks, thereby defining a combined mask. In some such examples, the masks are combined via a voting mechanism in which a confidence level is assigned to a corresponding pixel thereof.

At block 608, the headland identifier 404 generates contours based on the masks and/or the combined mask. For example, the contours are generated based on an analysis and/or manipulation of the masks. Additionally or alternatively, the headland identifier 404 determines spatial areas and/or volumes (e.g., 3-D volumes) associated with the headland.

At block 610, in some examples, the headland identifier 404 converts the contours. In some examples, the contours are converted to geospatial coordinates. The conversion of the contours can be based on spatial or scale data associated with the data that was converted to images by the image analyzer 406.

At block 612, the headland identifier 404 identifies and/or characterizes the headland. In this example, the headland is identified with and/or based on the aforementioned contours. In some examples, the headlands and/or associated contours thereof are identified based on thresholding and/or post-processing operations, such as median filtering, for example.

At block 614, it is determined whether to repeat the process. If the process is to be repeated (block 614), control of the process returns to block 602. Otherwise, the process ends.

In some examples, the headlands are identified in substantially real time as the agricultural vehicle 102 traverses the field. For example, the headland may be identified as the agricultural vehicle 102 performs an agronomic operation (e.g., seeding, harvesting, etc.).

FIG. 7 is a subroutine 606 of the example method 600 shown in FIG. 6. In the illustrated example of FIG. 7, masks are generated and/or calculated for identification of a headland. The masks can be generated based on varying pixel density of the images. In particular, the different masks can be generated based on different aspects of the images. For example, one mask is based on a pixel density of turning areas from the images of a first image (e.g., a first set of images) and a second mask is based on pixel density associated with heading variations expressed in pixel density of a second image (e.g., a second set of images). In some examples, the different masks are generated simultaneously and/or in parallel. Additionally or alternatively, masks to be generated are selected based on a desired accuracy level for a headland identification.

At block 702, in some examples, the mask generator 408 generates an exterior mask. The exterior mask can correspond to exterior edges and/or borders of a field.

At block 704, in some examples, the mask generator 408 generates a heading variation mask that corresponds to heading variations of the agricultural vehicle 102 during an agronomic operation.

At block 706, in some examples, the mask generator 408 generates a boundary mask corresponding to boundaries of the field.

At block 708, in some examples, the mask generator 408 generates a track density mask.

At block 712, in some examples, the mask generator 408 generates a heading edges mask.

At block 714, in some examples, the mask generator 408 generates a turn mask. The turn mask can correspond to areas in which the agricultural vehicle 102 turns on the field.

At block 716, the example mask generator 408 and/or the image analyzer 406 determines whether additional masks are to be generated/added. This determination may be based on whether a combined mask of the generated masks includes sufficient information (e.g., for contours to be generated) and/or whether the masks enable headland determination with a sufficient accuracy level (e.g., an accuracy level that exceeds an accuracy threshold). If additional masks are to be generated (block 716), control of the process returns to block 702. Otherwise, the process ends/returns. In some examples, the mask generator 408 determines and/or selects a combination of mask types to be used for headland identification (e.g., based on a field type, based on field data, a desired level of quality of data, etc.).

Figure 8:
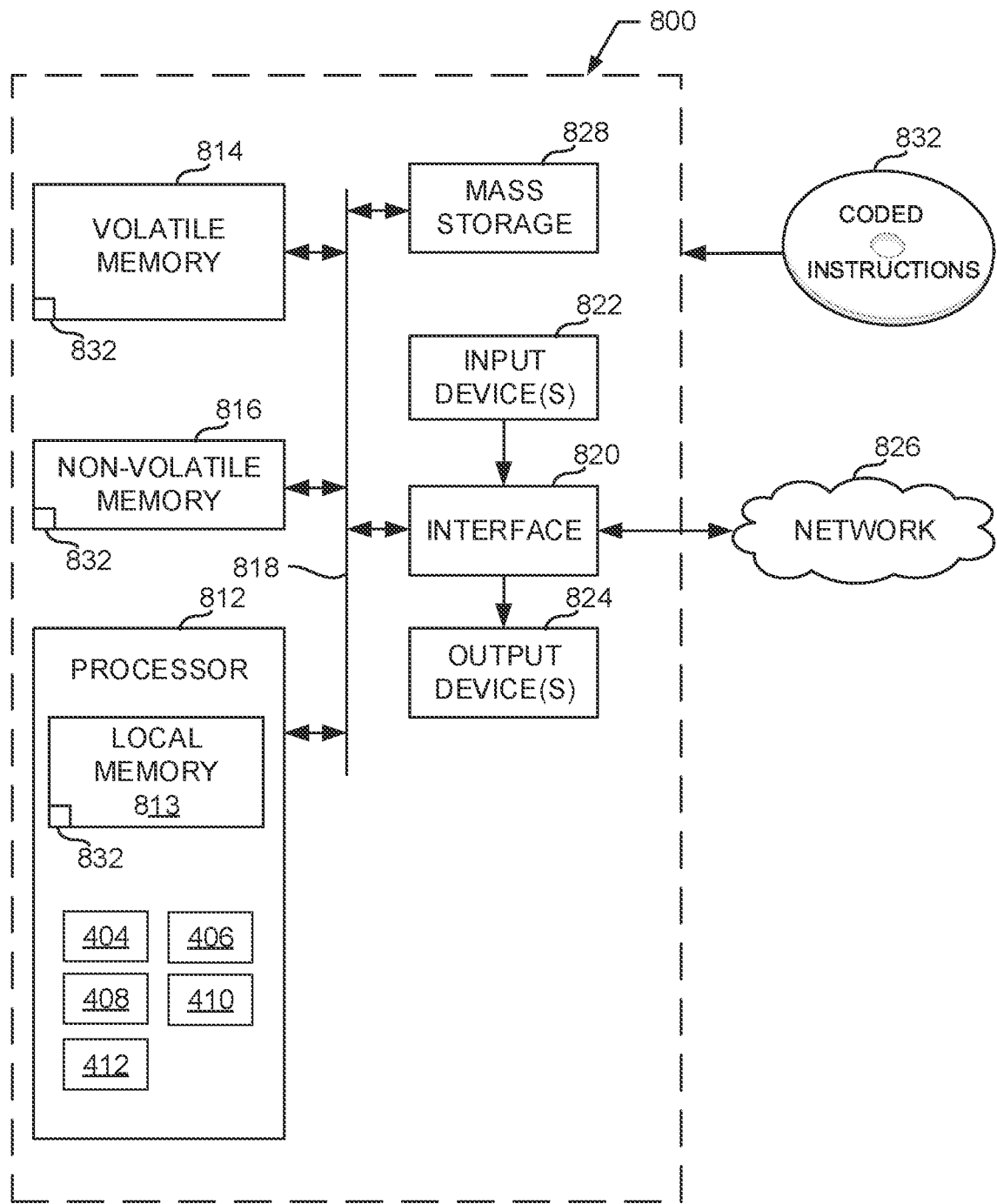
FIG. 8 is a block diagram of an example processing platform structured to execute the instructions of FIGS. 6 and 7 to implement the example agricultural analyzer system of FIG. 1 and/or the example headland analyzer system of FIG. 4.

FIG. 8 is a block diagram of an example processor platform 800 structured to execute the instructions of FIGS. 6 and 7 to implement the headland analyzer system 400 of FIG. 4. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example headland identifier 404, the example image analyzer 406, the example mask generator 408 and the example mapper 410.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

Figure 9:
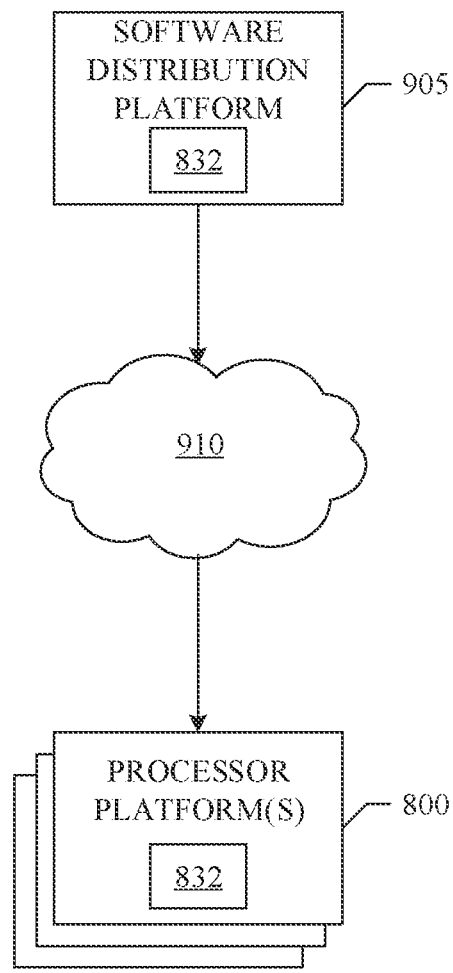
FIG. 9 is a block diagram of an example software distribution platform to distribute software (e.g., software corresponding to the example computer readable instructions of FIGS. 6 and 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIGS. 6 and 7 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIGS. 6 and 7. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 600 of FIGS. 6 and 7, as described above. The one or more servers of the example software distribution platform 905 are in communication with a network 910, which may correspond to any one or more of the Internet and/or any of the example network 120 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 600 of FIGS. 6 and 7, may be downloaded to the example processor platform 800, which is to execute the computer readable instructions 832 to implement the example headland analyzer system 400. In some example, one or more servers of the software distribution platform 905 periodically offer, transmit, and/or force updates to the software (e.g., the example computer readable instructions 832 of FIGS. 6 and 7) to ensure improvements, patches, updates, etc. are distributed and applied to the software at the end user devices.

Example 1 includes an apparatus to identify a headland of a field. The apparatus includes an image analyzer to generate an image from data corresponding to path information of at least one field operation performed on the field, a mask generator to generate a mask based on the image, and a headland identifier to identify the headland in the field based on the mask.

Example 2 includes the apparatus as defined in example 1, wherein the headland identifier is to identify the headland by generating contours associated with the headland based on the mask, and storing the contours as contour data.

Example 3 includes the apparatus as defined in example 1, wherein the mask is a first mask, wherein the mask generator is to combine the first mask and a second mask to define a combined mask, the second mask to be generated from the image, and wherein the headland identifier is to identify the headland based on the combined mask.

Example 4 includes the apparatus as defined in example 3, wherein the mask generator is to assign a confidence level to pixels of the combined mask.

Example 5 includes the apparatus as defined in example 1, wherein the headland identifier is to identify the headland via median filtering.

Example 6 includes the apparatus as defined in example 1, further including a mapper to transfer the data from a data domain to a geospatial domain.

Example 7 includes the apparatus as defined in example 1, wherein the mask generator generates the mask via a convolutional analysis.

Example 8 includes the apparatus as defined in example 7, wherein the convolution analysis generates a heading variation mask and a density mask.

Example 9 includes a non-transitory computer readable medium comprising instructions which, when executed, cause at least one processor to generate an image from data corresponding to path information of at least one field operation performed on the field, generate a mask based on the image, and identify a headland of the field based on the mask.

Example 10 includes the non-transitory computer readable medium as defined in example 9, wherein the instructions cause the at least one processor to generate contours associated with the headland based on the mask, and store the contours as contour data.

Example 11 includes the non-transitory computer readable medium as defined in example 9, wherein the mask is a first mask, and wherein the instructions cause the at least one processor to generate a second mask, and combine the first mask and the second mask to define a combined mask, wherein the headland is identified based on the combined mask.

Example 12 includes the non-transitory computer readable medium as defined in example 11, wherein the instructions cause the at least one processor to assign a confidence level to pixels of the combined mask.

Example 13 includes the non-transitory computer readable medium as defined in example 9, wherein the instructions cause the at least one processor to identify the headland via median filtering.

Example 14 includes the non-transitory computer readable medium of example 9, wherein the image is generated by transferring the data from a data domain to a geospatial domain.

Example 15 includes the non-transitory computer readable medium of example 9, wherein the mask is generated via a convolutional analysis.

Example 16 includes the non-transitory computer readable medium of example 15, wherein the convolution analysis generates a heading variation mask and a density mask.

Example 17 includes a method of identifying a headland of a field. The method includes generating, by executing instructions with at least one processor, an image from data corresponding to path information of at least one field operation performed on the field, generating, by executing instructions with the at least one processor, a mask based on the image, and identifying, by executing instructions with the at least one processor, the headland based on the mask.

Example 18 includes the method as defined in example 17, further including generating, by executing instructions with the at least one processor, contours associated with the headland based on the mask, and storing, by executing instructions with the at least one processor, the contours as contour data.

Example 19 includes the method as defined in example 17, wherein the mask is a first mask, and further including generating, by executing instructions with the at least one processor, a second mask based on the image, and combining, by executing instructions with the at least one processor, the first mask and the second mask to define a combined mask, wherein the headland is identified based on the combined mask.

Example 20 includes the method as defined in example 19, further including assigning, by executing instructions with the at least one processor, a confidence level to pixels of the combined mask.

Example 21 includes the method as defined in example 17, wherein the identifying of the headland includes median filtering.

Example 22 includes the method as defined in example 17, wherein the generating of the image includes transferring the data from a data domain to a geospatial domain.

Example 23 includes the method as defined in example 17, wherein the generating of the mask includes a convolutional analysis.

Example 24 includes the method as defined in example 23, wherein the convolution analysis generates a heading variation mask and a density mask.

Example 25 includes an apparatus having at least one memory, instructions, and at least one processor to generate an image from data corresponding to path information of at least one field operation performed on a field, generate a mask based on the image, and identify a headland of the field based on the mask.

From the foregoing, it will be appreciated that example methods, apparatus and articles of manufacture have been disclosed that enable accurate and cost-effective analysis of headlands. Examples disclosed herein do not necessitate satellite imagery. Examples disclosed herein can be utilized for path planning applications by offering initial values for input parameters based on previous field operations, providing spatial information about headlands, providing a reliable benchmark for field decomposition functions, and aiding in identifying field boundaries and in-field obstacles. Further, examples disclosed herein can also reduce and/or eliminate a need for user input corresponding to headlands, thereby saving operator time.

The disclosed methods, apparatus and articles of manufacture improve the efficiency of using a computing device by implementing computer vision techniques that are computationally efficient. Further, examples disclosed herein utilize calculations that are relatively independent of field area and data size (e.g., based on utilizing an image and processing the data in a pixel domain). The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to identify a headland of a field, the apparatus comprising:
    machine readable instructions; and
    processor circuitry to at least one of instantiate or execute the machine readable instructions to at least:
        generate an image from data corresponding to path information of at least one field operation performed on the field;
        generate a heading variation mask and a density mask based on the image via a convolutional analysis; and
        identify the headland in the field based on the heading variation mask and the density mask.

2. The apparatus as defined in claim 1, wherein the f processor circuitry is to identify the headland by:
    generating contours associated with the headland based on at least one of the heading variation mask or the density mask; and
    storing the contours as contour data.

3. The apparatus as defined in claim 1, wherein the heading variation mask is a first mask, wherein the density mask is a second mask, and wherein the processor circuitry is to combine the first mask and the second mask to define a combined mask, and wherein the processor circuitry is to identify the headland based on the combined mask.

4. The apparatus as defined in claim 3, wherein the processor circuitry is to assign a confidence level to pixels of the combined mask.

5. The apparatus as defined in claim 1, wherein the processor circuitry is to identify the headland via median filtering.

6. The apparatus as defined in claim 1, wherein the processor circuitry is to transfer the data from a data domain to a geospatial domain.

7. A non-transitory computer readable medium comprising instructions which, when executed, cause at least one processor to:
    generate an image from data corresponding to path information of at least one field operation performed on the field;
    generate a heading variation mask based on the image via at least one convolutional analysis;
    generate a density mask based on the image via the at least one convolutional analysis; and
    identify a headland of the field based on the heading variation mask and the density mask.

8. The non-transitory computer readable medium as defined in claim 7, wherein the instructions cause the at least one processor to:
    generate contours associated with the headland based on at least one of the heading variation mask or the density mask; and
    store the contours as contour data.

9. The non-transitory computer readable medium as defined in claim 7, wherein the heading variation mask is a first mask, wherein the density mask is a second mask, and wherein the instructions cause the at least one processor to
    combine the first mask and the second mask to define a combined mask,
    wherein the headland is identified based on the combined mask.

10. The non-transitory computer readable medium as defined in claim 9, wherein the instructions cause the at least one processor to assign a confidence level to pixels of the combined mask.

11. The non-transitory computer readable medium as defined in claim 7, wherein the instructions cause the at least one processor to identify the headland via median filtering.

12. The non-transitory computer readable medium of claim 7, wherein the image is generated by transferring the data from a data domain to a geospatial domain.

13. A method of identifying a headland of a field, the method comprising:
    generating, by executing instructions with at least one processor, an image from data corresponding to path information of at least one field operation performed on the field;
    generating, by executing instructions with the at least one processor, a heading variation mask and a density mask based on the image via a convolutional analysis; and
    identifying, by executing instructions with the at least one processor, the headland based on the heading variation mask and the density mask.

14. The method as defined in claim 13, further including:
    generating, by executing instructions with the at least one processor, contours associated with the headland based on the heading variation mask; and
    storing, by executing instructions with the at least one processor, the contours as contour data.

15. The method as defined in claim 13, wherein the heading variation mask is a first mask, and wherein the density mask is a second mask, and further including
    combining, by executing instructions with the at least one processor, the first mask and the second mask to define a combined mask, wherein the headland is identified based on the combined mask.

16. The method as defined in claim 15, further including assigning, by executing instructions with the at least one processor, a confidence level to pixels of the combined mask.

17. The method as defined in claim 13, wherein the identifying of the headland includes median filtering.

18. The method as defined in claim 13, wherein the generating of the image includes transferring the data from a data domain to a geospatial domain.

19. An apparatus comprising:
- at least one memory;
- instructions; and
- at least one processor to execute the instructions to:
    - generate an image from data corresponding to path information of at least one field operation performed on a field,
    - generate a heading variation mask and a density mask based on the image via a convolution analysis, and
    - identify a headland of the field based on the heading variation mask and the density mask.

\* \* \* \* \*

UNITED STATES PATENT AND TRADEMARK OFFICE
CERTIFICATE OF CORRECTION

| | |
|---|---|
| PATENT NO. | : 11,967,059 B2 |
| APPLICATION NO. | : 17/323480 |
| DATED | : April 23, 2024 |
| INVENTOR(S) | : Anderson et al. |

It is certified that error appears in the above-identified patent and that said Letters Patent is hereby corrected as shown below:

On the Title Page

Item (73), under "Assignee", delete "Deere &Company, Moline, IL (US)" and insert
--Deere & Company, Moline IL (US)--.

In the Claims

Column 15, Claim 2, Line 47, Delete "f".

Signed and Sealed this
Nineteenth Day of November, 2024

*Katherine Kelly Vidal*

Katherine Kelly Vidal
*Director of the United States Patent and Trademark Office*